US006935527B1

(12) United States Patent
Brock

(10) Patent No.: US 6,935,527 B1
(45) Date of Patent: Aug. 30, 2005

(54) LOCKING FILLER CAP

(76) Inventor: Richard E. Brock, P.O. Box 238, St. Marys, OH (US) 45885

(*) Notice: Subject to any disclaimer, the term of this patent is extended or adjusted under 35 U.S.C. 154(b) by 0 days.

(21) Appl. No.: 10/104,184

(22) Filed: Mar. 22, 2002

(51) Int. Cl.[7] .............................................. B65D 55/14
(52) U.S. Cl. .............................. 220/210; 220/DIG. 33; 220/243; 220/254.1; 70/168; 70/172; 70/232
(58) Field of Search ............................... 220/210, 243, 220/254.1, DIG. 20, DIG. 33; 70/163, 164, 70/167, 168, 169, 171, 172, 173, 232

(56) References Cited

U.S. PATENT DOCUMENTS

| | | | | | |
|---|---|---|---|---|---|
| 1,599,685 | A | * | 9/1926 | Spaeth | 220/210 |
| 1,783,971 | A | * | 12/1930 | Miquet | 70/490 |
| 1,824,352 | A | | 9/1931 | Isaacs | |
| 1,982,879 | A | * | 12/1934 | Causey | 220/86.2 |
| 2,131,243 | A | | 9/1938 | Whitaker | |
| 2,138,871 | A | * | 12/1938 | Malluk | 220/210 |
| 3,537,283 | A | | 11/1970 | Mross | |
| 3,564,879 | A | * | 2/1971 | Bennet | 70/232 |
| 3,915,335 | A | | 10/1975 | Shanklin et al. | |
| 3,998,353 | A | | 12/1976 | Farelli | |
| 4,028,914 | A | | 6/1977 | Saele et al. | |
| 4,064,717 | A | | 12/1977 | Neiman | |
| 4,107,960 | A | | 8/1978 | Neiman | |
| 4,143,530 | A | | 3/1979 | Murtezov et al. | |
| 4,160,511 | A | * | 7/1979 | Hukuta et al. | 220/210 |
| 4,317,345 | A | | 3/1982 | Hinson | |
| 4,362,035 | A | * | 12/1982 | Vitale | 70/165 |
| 4,712,703 | A | * | 12/1987 | Oddenino | 220/210 |
| 4,779,434 | A | * | 10/1988 | Derman | 70/230 |
| 4,795,054 | A | | 1/1989 | Brown | |
| 4,809,870 | A | | 3/1989 | Goodall | |
| 4,984,698 | A | | 1/1991 | Stuckey | |
| 4,986,097 | A | | 1/1991 | Derman | |
| 5,205,312 | A | * | 4/1993 | Jerman et al. | 137/15.02 |
| 5,467,621 | A | | 11/1995 | Gravino | |
| 5,548,982 | A | * | 8/1996 | Rawling | 70/208 |
| 5,667,093 | A | * | 9/1997 | Lefevre | 220/293 |
| 5,845,800 | A | | 12/1998 | Shaw et al. | |
| 5,904,057 | A | * | 5/1999 | Abney et al. | 70/167 |
| 6,209,745 | B1 | * | 4/2001 | Jansson | 220/288 |
| 6,648,160 | B2 | * | 11/2003 | Hotch | 220/255 |
| 2002/0158072 | A1 | * | 10/2002 | Hotch | 220/288 |

FOREIGN PATENT DOCUMENTS

| | | | | | |
|---|---|---|---|---|---|
| GB | 2220720 | A | * | 1/1990 | F16B 41/00 |

* cited by examiner

*Primary Examiner*—Jes F. Pascua
*Assistant Examiner*—James Smalley
(74) *Attorney, Agent, or Firm*—Standley Law Group LLP

(57) ABSTRACT

A lockable filler cap assembly for fuel tanks and other fluid-holding containers. The assembly is readily adaptable to function as a normally operating non-locking filler cap and to function as a locked filler cap. The lockable filler cap assembly includes a cap having a receptacle whereby an insert may be placed and locked into the receptacle. In the locked condition, a shield on the insert covers at least a portion of the cap, thereby discouraging access to the cap for its removal and, in turn, access to the contents of the associated tank.

5 Claims, 5 Drawing Sheets

FIG—1

LOCKING FILLER CAP

BACKGROUND AND SUMMARY OF THE INVENTION

The present invention relates to a lockable filler cap assembly for fuel tanks and other fluid-holding containers.

Typically, an opening is made into the wall of such a tank. A substantially cylindrical sleeve is inserted into the opening and the sleeve is permanently attached to the tank to become a filler tube. The filler tube can be threaded on its inside surface which is mated with a filler cap having a complementary threaded portion on its outside surface. The threaded segments are typically cut as right hand threads, meaning the filler cap is removed by rotating the cap counterclockwise. Conversely, the filler cap is secured to the filler tube by engaging the complementary threaded portions of the cap and the filler tube and rotating the cap in a clockwise direction. In an alternative arrangement, the cap can be secured by a simple thread on the filler tube engaging lugs on the cap wherein only a quarter turn is required to effect the seal between the cap and the filler tube.

In numerous fluid handling and storage applications, it is desirable to seal the opening of a tank, such as the threaded conduit of a filler tube, with a closure which cannot be readily removed by unauthorized persons. Unauthorized access is desirable to prevent the theft of the contents of the tank as well as to prevent vandalism or sabotage by the addition of materials or foreign fluids to the contents of the tank. Locking caps for fuel tanks and similar containers are well known.

The present invention is an apparatus to provide a lockable cap assembly for fuel tanks and other fluid-holding vessels. The present invention is a lockable cap assembly providing an adaptable, interchangeable, easy to operate, and durable locking mechanism suitable for locking a cap onto the filler tubes of tanks carrying liquids such as motor fuels, water, wastewater, and sewage.

An object of the present invention is to provide an assembly that is readily adaptable to function as a normally operating non-locking filler cap and to function as a locked filler cap. The present invention includes a receptacle whereby an insert may be placed and locked into the receptacle. In the locked condition, a shield on the insert covers at least a portion of the cap, thereby discouraging access to the cap for its removal and, in turn, access to the contents of the associated tank.

Such an arrangement as described above is demonstrated in an example embodiment of the present invention wherein the cap has the profile of a marine deck fill plate. In typical usage, the marine deck fill plate is removed from its associated filler opening by engaging a pair of holes on the deck plate with a pair of complementary sized pins on a tool such as a wrench. Usually by turning the wrench and cap counterclockwise, the cap can be removed from its threaded engagement between an outside diameter of the cap and an inside diameter of the filler tube. Without the insert of the present invention placed into the receptacle of the cap, the cap is removable and replaceable in the same manner as any typical marine deck fill plate. To lock the cap of, the example embodiment to the filler tube of a boat or any other tank using a typical marine deck fill plate, an insert with a lock is placed into the receptacle of the cap. The insert includes a shield that at least covers the pair of holes on the deck plate profile of the cap. By locking the insert into the receptacle, removal of the cap is discouraged since the typical means of removal of the cap, i.e., the wrench or other similar tools as mentioned above, cannot be used since the shield of the insert covers and prevents usage of the pair of holes on the deck plate profile. In addition, the shield of the insert can be sized to completely cover the cap or to form a flushmount with the vicinity of the tank filler opening, thereby making an assembly that is resistant to prying or removal by pliers and other adaptable tools.

The locking of the insert into the cap of the present invention is provided by a lock being placed within a complementary opening inside the insert such that a latch operatively connected to the lock and placed in the locked position will protrude through a second opening to a position beyond the outside diameter of the insert and into an axially aligned groove in the receptacle of the cap. In this manner, the insert is secured within the receptacle of the cap of the present invention.

An object of the present invention is to provide an interchangeable assembly between the cap and the insert with the lock of the present invention. In this regard, the insert with the lock may be removed from a first cap and used in a second cap having the same sized receptacle for receipt of the insert with the lock. In this instance, the filler tubes associated with the first cap and the second cap, respectively, can always remain sealed with a normally functioning filler cap and access to a given tank is restricted only by the decided placement and usage of the locked insert. Such interchangeability can be useful in situations involving access to fuel tanks for rental vehicles and fleet vehicles, or for occasions requiring lockout and tagging procedures.

Another manner for securing the filler cap can be described in a second example embodiment of the present invention. As described earlier with regard to the operation of a marine deck plate, in this embodiment the shield of the insert may include a pair of holes as are found on the typical deck plate. In this example, the insert with the lock rotates freely within the cap when the cap is in the secure or "locked" setting. Since the shield on the insert spins freely within the cap, a wrench designed to engage a pair of holes on the deck plate with a pair of complementary sized pins would only act to spin the insert within the cap. However, when the insert is locked into the cap by engagement of a latch within a latch slot on the cap, the assembly comprised of the insert with lock and the cap will move as an entire unit. As a result, the assembly is removable and replaceable in the same manner as a typical marine deck fill plate.

An object of the present invention is to provide a locking filler assembly that can be readily adapted to pre-existing fillers on tanks. In addition the assembly can be made from any of a variety of materials such as metal, metal alloys, plastic, and reinforced plastic that are typically used to make a filler caps. The present invention is readily adaptable for use in corrosive environments such as in a marine application with exposure to salt water.

As is the state of the art, a mechanical seal between the filler tube and the cap can be obtained by close physical tolerances between the threaded portions of the filler tube and the cap. The seal may also be enabled or supplemented with sealing materials such as rubber, rubber compounds, rubber-containing mixtures, springs, deformable materials, and compressible materials.

In addition to the novel features and advantages mentioned above, other objects and advantages of the present invention will be readily apparent from the following descriptions of the drawings and preferred embodiments.

DETAILED DESCRIPTION OF THE EXEMPLARY EMBODIMENT(S)

Figure 1:
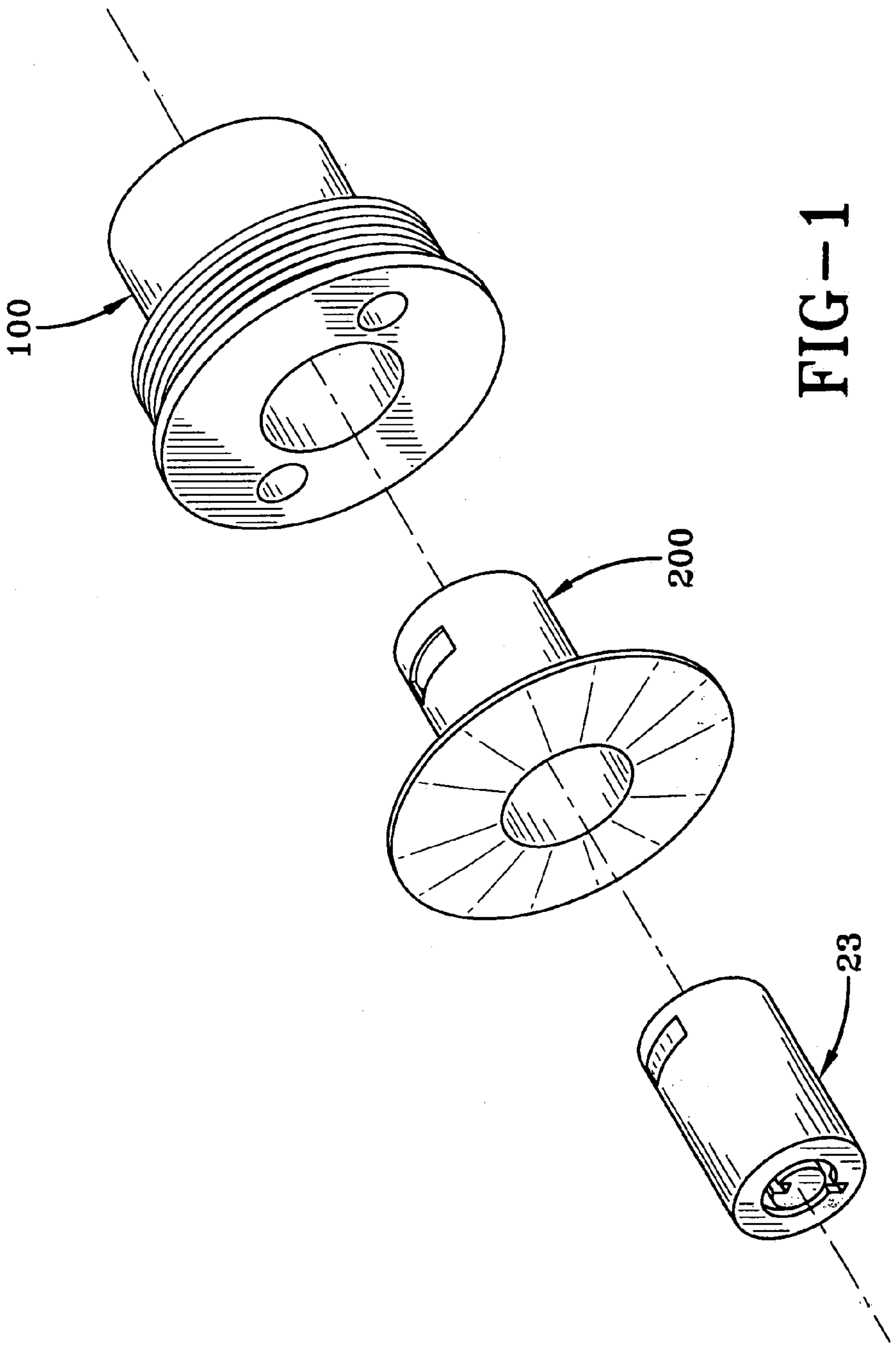
FIG. 1 is a perspective view of an embodiment of the cap, the insert, and the lock of the present invention.

The present invention relates to a lockable filler cap assembly for fuel tanks and other fluid-holding containers. FIG. 1 shows perspective views of an embodiment of the cap 100, the insert 200, and the lock 23.

Figure 2:
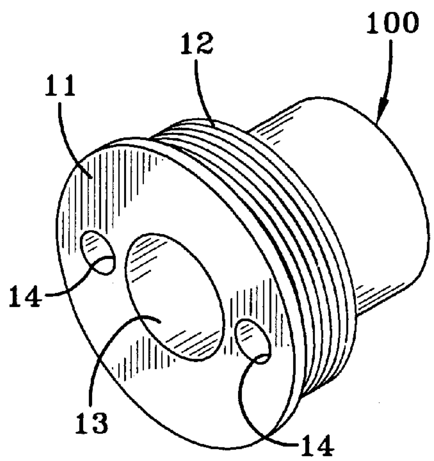
FIG. 2 is a perspective view of an embodiment of the cap of the present invention.
Figure 3:
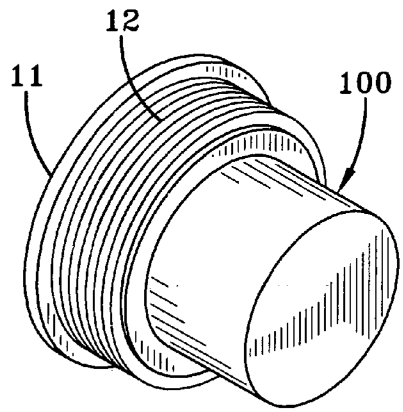
FIG. 3 is a perspective view of an embodiment of the cap of the present invention.

FIGS. 2 and 3 show perspective views of an embodiment of the cap 100 of the present invention. As can be observed, the cap 100 is shown with a top 11 having a first outside diameter, and a thread 12 on a second outside diameter sized to engage a complementary thread on the inside diameter of a tank filler opening (not shown). FIG. 2 also shows the outline of a receptacle 13 partly defined by a first inside diameter in the top 11. The example embodiment of FIG. 2 also shows the outline of a pair of holes 14 cut into the top 11 as would be used in an application of the cap as a marine deck fill plate. The holes 14 would receive a pair of complementary sized pins on a wrench or other similar tool in order to turn the cap while engaging the thread of the tank filler opening.

Figure 4:
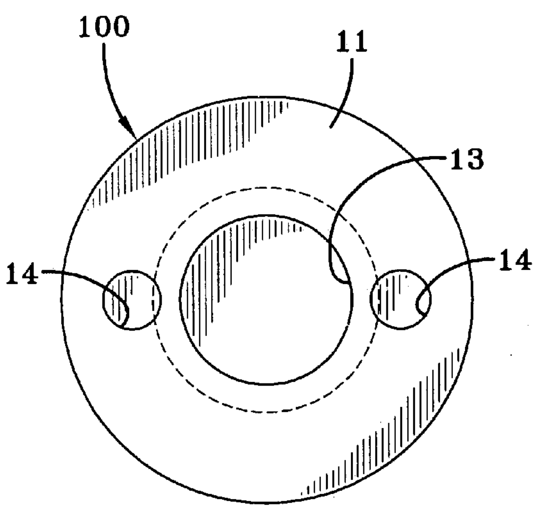
FIG. 4 is a top view of an embodiment of the cap of the present invention.

FIG. 4, is a top view of an embodiment of the cap 100 of the present invention, providing a better view of the outline of the receptacle 13 and the holes 14 in the top. A groove 15, in an inside wall of the receptacle 13, is shown as a dashed line on FIG. 5 and is also shown in FIG. 4 as a dashed line having a diameter larger than the first inside diameter in the top 11 that partly defines the receptacle 13. The groove 15 has a second inside diameter in an inside wall of the cap 100 defining another portion of the receptacle 13.

Figure 5:
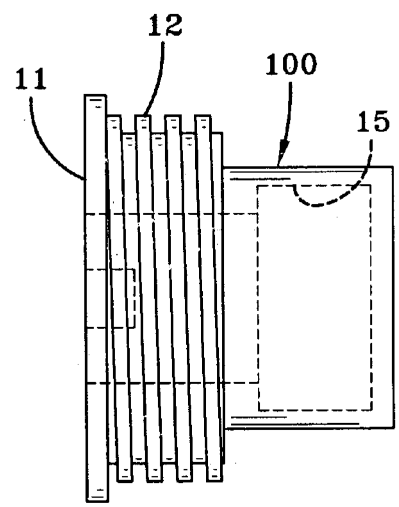
FIG. 5 is a side view of an embodiment of the cap of the present invention.
Figure 6:
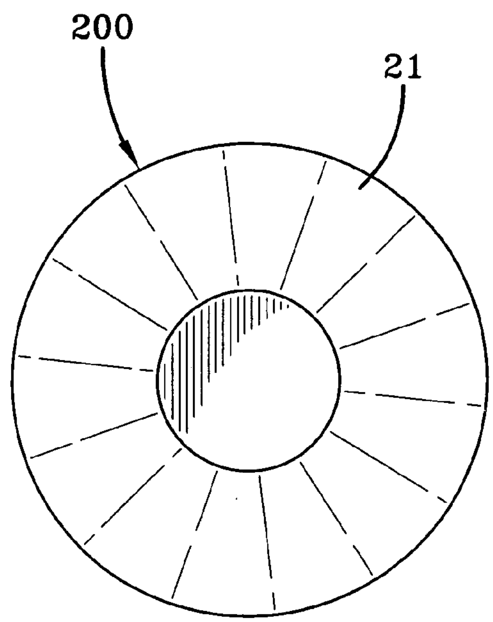
FIG. 6 is a top view of an embodiment of the insert of the present invention.
Figure 7:
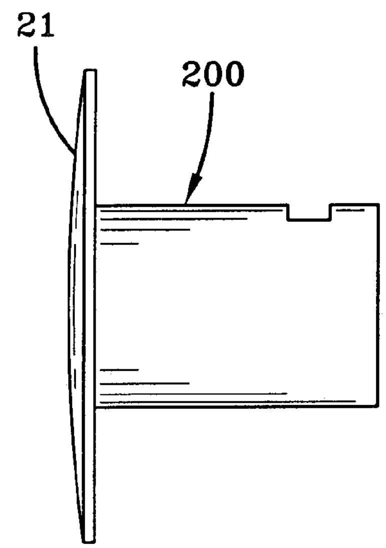
FIG. 7 is a side view of an embodiment of the insert of the present invention.
Figure 8:
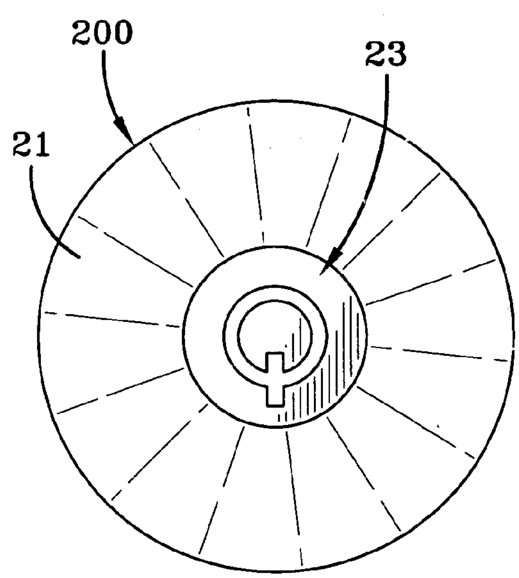
FIG. 8 is a top view of an embodiment of the insert and lock of the present invention.
Figure 9:
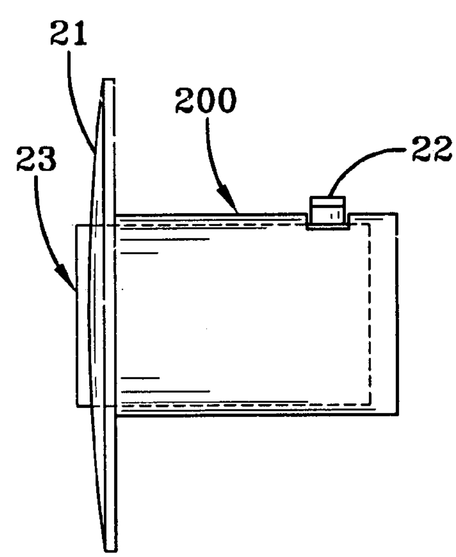
FIG. 9 is a side view of an embodiment of the insert and lock of the present invention.

FIGS. 6 and 7 shows top and side views, respectively, of an embodiment of the insert 200 of the present invention. As can be observed, the insert 200 has a third outside diameter over a major portion of its length and a shield 21 having a larger fourth outside diameter. FIGS. 8 and 9 show top and side views, respectively, of an embodiment of the insert 200 with the lock 23 placed inside the insert. FIGS. 7 and 9 show the opening in the insert 200 for the latch 22 that is axially aligned with the groove 15 (shown in FIG. 5) when the insert 200 is seated into the receptacle 13 of the cap 100. The latch 22 can be operatively moved through an opening in the insert 200 by the lock 23 as shown in FIG. 9. The top view shown in FIG. 8 illustrates an example of the shield 21 of the insert 200 and the keyway for an example lock 23.

Figure 12:
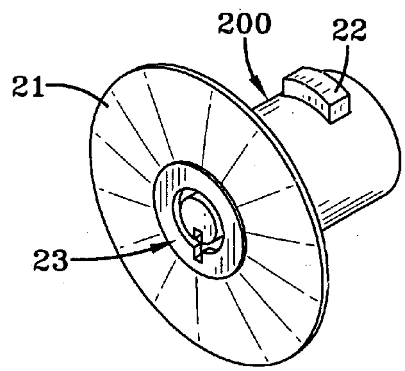
FIG. 12 is a perspective view of an embodiment of the insert and lock of the present invention.
Figure 13:
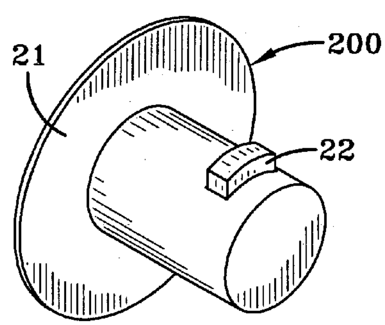
FIG. 13 is a perspective view of an embodiment of the insert and lock of the present invention.

FIGS. 12 and 13 show perspective views of the lock 23 placed into the insert 200 of an example embodiment of the present invention. Both figures illustrate an example of the insert 200 being in a locked condition by the latch 22 having been moved through an opening in the insert 200. In this example of a locked condition, the latch 22 protrudes beyond the insert's third outside diameter. The placement of the latch 22 is aligned along the axis of the insert 200 so as to enter the groove 15 in the receptacle 13 when the insert 200 is seated and locked into the cap 100.

Figure 10:
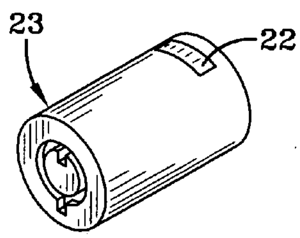
FIG. 10 is a perspective view of an embodiment of the lock of the present invention.
Figure 11:
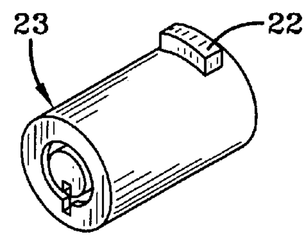
FIG. 11 is a perspective view of an embodiment of the lock of the present invention.

As shown in FIG. 1, the shield of the insert 200 is of a diameter sufficiently large enough to cover at least a portion of the top of the cap 100 to prevent the cap's removal when the insert 200 is locked into the cap 100. The groove 15, shown in FIG. 5, is in axial alignment to receive the latch 22 of the lock 23 (See FIGS. 10 and 11) so that when the latch is operatively moved through an opening in the insert 200 (See FIGS. 7, 9, 12 or 13) while being seated inside the cap 100, the insert is prevented from removal from the cap. As a result, a typical means of engaging the cap 100 for its removal or installation, such as by engagement of the holes 14 as shown in FIG. 2 or 4; is unable to occur because the insert 200 securely covers the holes 14. In addition, the shield 21 may be sufficiently sized to resist the grasping of the cap 100 by pliers or other adaptable tools when the insert 200 is locked to the cap. In this manner the present invention provides a secure, lockable filler cap for applications such as a use on fuel filler tubes.

Figure 14:
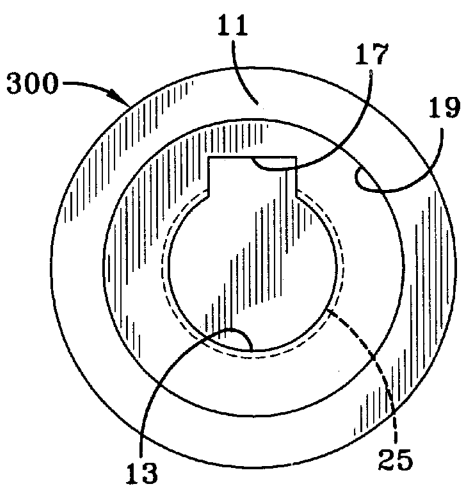
FIG. 14 is a top view of an embodiment of the cap of the present invention.
Figure 15:
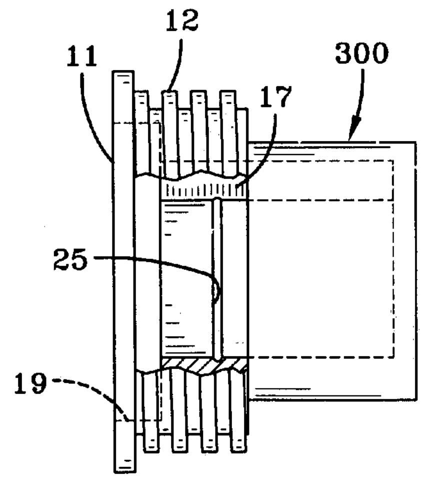
FIG. 15 is a side view of an embodiment of the cap of the present invention.
Figure 18:
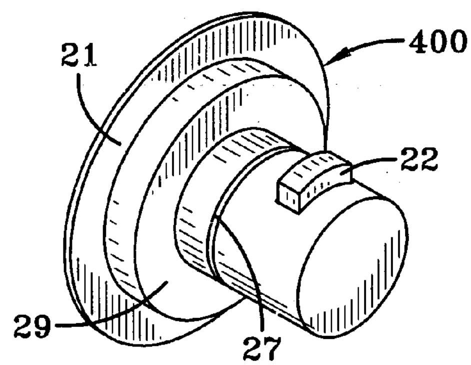
FIG. 18 is a perspective view of an embodiment of the insert and lock of the present invention.
Figure 19:
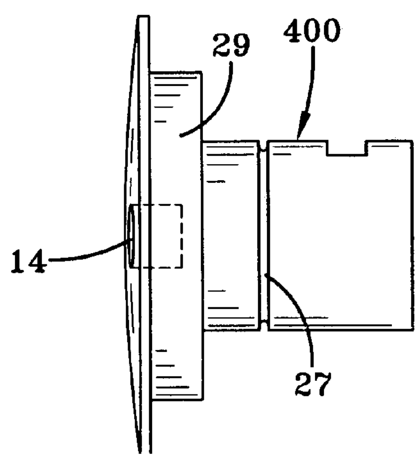
FIG. 19 is a side view of an embodiment of the insert of the present invention.

FIGS. 14 and 15 are top and side views, respectively, of another embodiment of the cap 300 of the present invention. Both figures show representations of the cap 300 having a top 11 with a first outside diameter and a thread 12 on a second outside diameter sized to engage a complementary thread on the inside diameter of a tank filler opening (not shown). FIGS. 14 and 15 also show the outline of a receptacle 13 partly defined by a first inside diameter in the top 11. A recess 19 in the top is defined by a second inside diameter that is less than the first outside diameter of the top 11 and greater than the first inside diameter defining the receptacle 13. As shown in FIG. 15, the recess 19 is also defined by a depth into the cap 300 that will adequately receive at least a portion of the raised ring 29 of the insert 400 shown in FIGS. 18 and 19. Another feature of this example embodiment is the snap ring groove for the cap 25 (FIGS. 15 and 16) and the snap ring groove for the insert 27 (FIGS. 18 and 19). The snap ring grooves 25 and 27 are aligned along the axis of the locking fuel cap assembly so that a common snap ring can engage both grooves, 25 and 27, when the insert 400 is seated into the cap 300. When the insert 400 is seated into cap 300 with a snap ring, the insert can turn or spin relatively freely within the cap but the insert is not readily removable from the cap.

Figure 16:
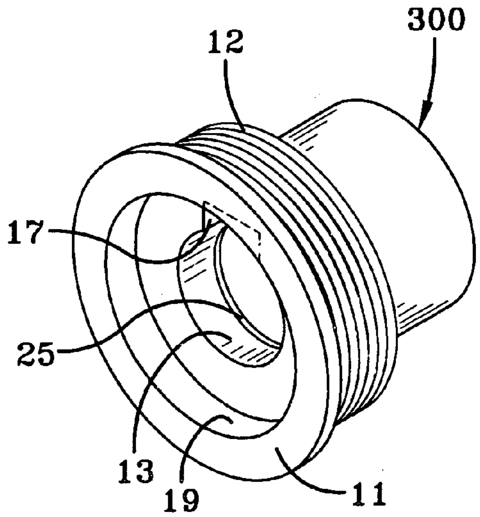
FIG. 16 is a perspective view of an embodiment of the cap of the present invention.
Figure 17:
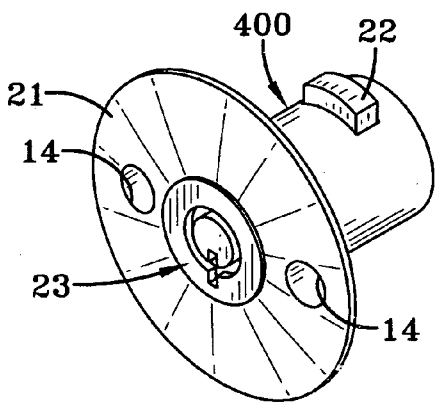
FIG. 17 is a perspective view of an embodiment of the insert and lock of the present invention.

As shown in FIGS. 14, 15, and 16 the cap 300 includes a slot 17. The slot 17 may run over only a portion of the longitudinal length of the receptacle 13. The slot 17 is sized to receive the latch 22 of the lock 23, shown in FIGS. 17 and 18. In this example embodiment, the insert 400 and cap 300 are assembled together with a snap ring or other means. If the latch 22 of the lock is extended into the slot 17 by passing through an opening in the insert 400, the insert and the cap 300 may be rotated as a single unit, thereby allowing the installation of the assembly into a complementary sized receptacle, such as a fuel filler neck, by engaging the threads 12 of the cap 300. In addition to physically turning the assembly into a fuel filler neck, the top of the insert 400 may have holes 14 such as shown in FIGS. 17 and 19 that may be used in an application of the assembly as a marine deck fill plate. If the latch 22 of the lock is retracted sufficiently so as to cease the engagement of the latch into the slot 17, then the insert 400 may spin within the cap 300. As a result, the coverage of the shield 21 over the top 11 of the cap 300 can discourage removal of the assembly from the fuel filler neck. In addition, if necessary, the lock 23 can be removed from the assembly, leaving the assembled insert 400 and cap 300 together and ready to receive a second lock from another authorized user.

What is claimed is:

1. A lockable assembly for a tank filler opening comprising:

a cap having a top with a first outside diameter, a thread on a second outside diameter adapted to engage a complementary thread on a first inside diameter of said tank filler opening, a receptacle defined by a second inside diameter in said top, and a groove in said receptacle, below said top, having a third inside diameter;

an insert having a third outside diameter, a substantially planar shield having a fourth outside diameter, wherein said shield comprises the upper surface of said lockable assembly, and wherein said shield covers at least a portion of said top, a first opening extending longitudinally through at least a portion of said insert, and a second opening extending laterally through at least a portion of said insert from said first opening to said third outside diameter, said second opening being axially aligned with said groove, wherein said second inside diameter of said receptacle provides a complementary fit for said third outside diameter of said insert, and wherein said shield is flushmount with the vicinity of said tank filler opening when the insert is placed inside said cap; and an interchangeable lock within said first opening having a latch, wherein said latch is operatively moved by said lock from said second opening to engage said groove, and wherein said latch is selected from the group consisting of: bolts, pins, tongues, ball bearings, and cams.

2. The lockable assembly of claim 1 wherein said shield is flushmount with the vicinity of said tank filler opening when said is placed inside said cap.

3. The lockable assembly of claim 1 wherein said assembly is adapted for a tank filler opening on a tank from the group consisting of a fuel tank, water tank, and waste tank.

4. The lockable assembly of claim 1 wherein said cap is made from a material from the group consisting of metal, metal alloys, fiberglass, plastic, reinforced plastic, rubber, wood, and combinations thereof.

5. The lockable assembly of claim 1 wherein said insert is made from a material from the group consisting of metal, metal alloys, fiberglass, plastic, reinforced plastic, rubber, wood and combinations thereof.

* * * * *